United States Patent [19]

Fuchs et al.

[11] 4,212,189
[45] Jul. 15, 1980

[54] TOOL FOR ISOTHERMAL FORGING

[75] Inventors: Walter Fuchs, Nussbaumen; Gernot H. Gessinger, Birmenstorf; Roland Künzli, Mellingen; Erwin Schönfeld, Baden, all of Switzerland

[73] Assignee: BBC Brown, Boveri & Company, Limited, Baden, Switzerland

[21] Appl. No.: 932,018

[22] Filed: Aug. 8, 1978

[30] Foreign Application Priority Data

Jan. 9, 1977 [CH] Switzerland ............... 10643/77

[51] Int. Cl.² ............................................. B21J 13/02
[52] U.S. Cl. ................................. 72/478; 72/342; 76/107 R; 219/10.57
[58] Field of Search ......... 72/342, 413, 478, DIG. 12, 72/DIG. 13; 76/107 R

[56] References Cited

U.S. PATENT DOCUMENTS

| | | | |
|---|---|---|---|
| 1,380,250 | 5/1921 | Reymond | 72/342 |
| 1,445,358 | 2/1923 | Russell | 72/478 |
| 2,439,246 | 4/1948 | Gibian | 72/342 |
| 2,851,750 | 9/1958 | Schaaber | 219/10.57 |
| 3,170,735 | 2/1965 | Coffin | 76/107 R |
| 3,478,562 | 11/1969 | Groos | 62/342 |
| 3,892,505 | 7/1975 | Doucherain et al. | 219/10.57 |
| 4,105,443 | 8/1978 | Dearnaley et al. | 76/107 R |

*Primary Examiner*—Lowell A. Larson
*Attorney, Agent, or Firm*—Oblon, Fisher, Spivak, McClelland & Maier

[57] ABSTRACT

A tool for isothermal forging is disclosed. The tool consists of two die halves, at least one of which consists of an assembly of individual components whose side facing the workpiece is provided with a thin electrically insulating layer. The assembly of the die half from individual components occurs following forming of the components by casting and/or forging, and machining of the formed components. The forming of the die halves from separate components makes it possible to adapt the components of the die half to the particular working conditions in an optimum manner. The provision of an insulating layer on the individual components reduces the risk of local welding and nonuniform temperature distribution during inductive heating.

33 Claims, 6 Drawing Figures

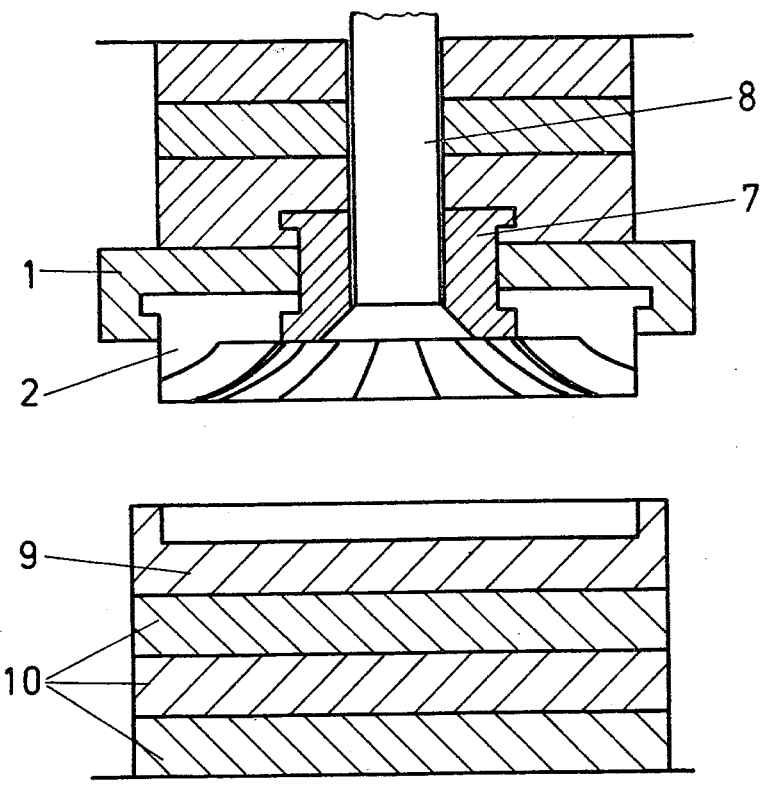
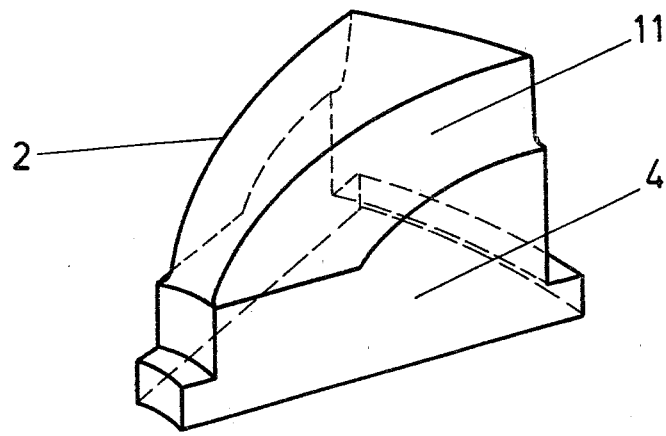
FIG. 5
FIG. 6

TOOL FOR ISOTHERMAL FORGING

BACKGROUND OF THE INVENTION

1. Field of the Invention

The invention relates to a tool for isothermal forging, consisting of two die halves, at least one of which is divided at least once.

2. DESCRIPTION OF THE PRIOR ART

Tools for isothermal forging are used for the comparatively slow plastic deformation of materials in the temperature region of superplasticity. The tool is here exposed to virtually the same high working temperature as the workpiece which is to be formed, and it is necessary in all cases to ensure that both the former and the latter are uniformly heated through. Inductive heating devices are customarily employed for heating the tool and in part also the workpiece as well as for keeping the working temperature constant. Hitherto, the tools were designed in such a way that the two die halves were each produced from one piece of a high-temperature alloy based on molybdenum or nickel. The frequently complicated shapes had to be worked out of the bulk of the tool blank, in most cases with the aid of electro-erosion. Installations of this type for isothermal forging have been disclosed in publications (for example D. J. Abson, F. J. Gurney, "Heated dies for forging and friction studies on a modified hydraulic forge press", Metals and Materials, December 1973; British Pat. No. 699 687; and U.S. Pat. No. 3,698,219).

One-piece tools, produced in the conventional manner, for isothermal forging are expensive since they require a high material consumption of high-temperature alloy which is sometimes difficult to work. Complicated shapes having deep grooves, small radii of curvature as well as sharp-edged and re-entrant corners cannot be produced by the customary machining methods and it is necessary to have recourse to very expensive processes, such as, for example, electro-erosion. Moreover, tools which have become useless as the result of local welding between the workpiece and the die, can only be repaired at high cost, and frequently cannot be repaired at all, because access to the affected point is impeded. In such cases, the total loss of a whole tool represents an essential further determining cost factor for the manufacture of complicated products.

SUMMARY OF THE INVENTION

It is the object of the invention to provide a tool for isothermal forging, which can be produced in a simple manner by means of conventional processes, while avoiding high material costs and machining costs, even when making complicated shapes. The tool should possess a long life in operation, should be amenable to maintenance and repair with simple means and should possess as long a total life as possible. Furthermore, it should be possible to bring the tool to the working temperature in the shop by means of inductive heating as rapidly and uniformly as possible in all cross-sections and to keep the latter constant.

According to the invention, this is achieved when, in the tool of the type initially defined, the divided die half is assembled from individual components, of which at least those individual components which face the workpiece to be forged are provided with a thin, electrically insulating layer on their contact surfaces or on all sides.

In a particularly advantageous embodiment, the components, which are provided with an electrically insulating layer and which face the workpiece to be forged, consist of a material having a higher hot strength and a higher wear resistance than that of the components facing away from the workpiece to be forged.

The decisive guiding concept, on which the invention is based, comprises the design of the tool in individual parts which can readily be worked, it being possible to adapt the material to the particular working conditions in an optimum manner, and the provision of an insulating layer on the individual components so that there is no risk of local welding and hence of a non-uniform temperature distribution during the inductive heating.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 5 shows a longitudinal section through an upper and a lower die half and FIG. 6 shows the perspective illustration of a segment-like individual component of a divided die half.

DETAILED DESCRIPTION OF THE PREFERRED EMBODIMENTS

Figure 1:
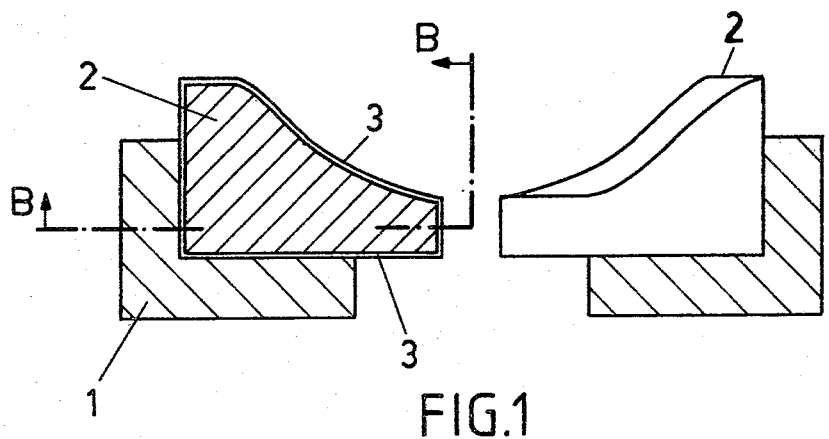
FIG. 1 shows a diagrammatic longitudinal section through a radially divided die half.

In FIG. 1, the longitudinal section through a radially divided die half is shown in a diagrammatic form. This die half can be used both as an upper die and as a lower die. The example chosen for the workpiece is a centro-symmetrical body (compressor wheel) having radially arranged vanes. The high temperature-resistant and wear-resistant components which consist of individual segments 2 and which, in the working position, directly face the workpiece to be forged, have flutes in their flanks so that two adjacent segments 2 each form a groove in a radial position. The segments 2 are provided on all sides with an insulating layer 3 so that they have no electrical contact with one another. The segments 2 are all held together by a ring 1. The insulating layer 3 can also be restricted to the surfaces of mutual contact of the segments 2 and to those with the ring 1. The only condition is that each segment, when in operation, is individually heated by induced currents and that no detrimental bridges, which can lead to welding, form between adjacent components of the tool or between components and the workpiece. Such welding would result in non-uniform heating of the tool and also, indirectly, of the workpiece. An attack on the workpiece during forging must be avoided under all circumstances.

Figure 2:
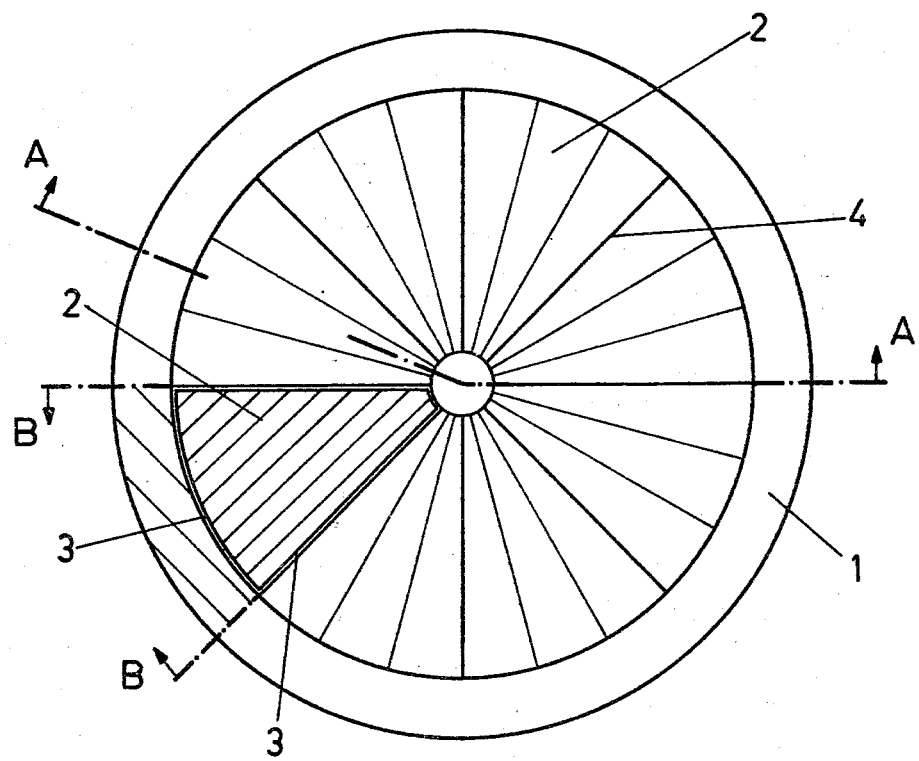
FIG. 2 shows a plan and a part cross-section through a radially divided die half.

FIG. 2 shows the plan view corresponding to FIG. 1, with a cut-out drawn as a part cross-section. Shown at 4 is the radial contact surface of adjacent segments 2. The other reference numerals can be taken from FIG. 1. It is self-evident that the segments 2 do not have to be mutually identical and can, for example, also have differing central angles. The radial contact surfaces 4 can also be of a stepped design in the axial direction so that an overlap of adjacent segments 2 in the tangential direction results. The division of the die half can be as desired in each case and can be adapted in an optimum manner to the shape of the workpiece in the die.

Figure 3:
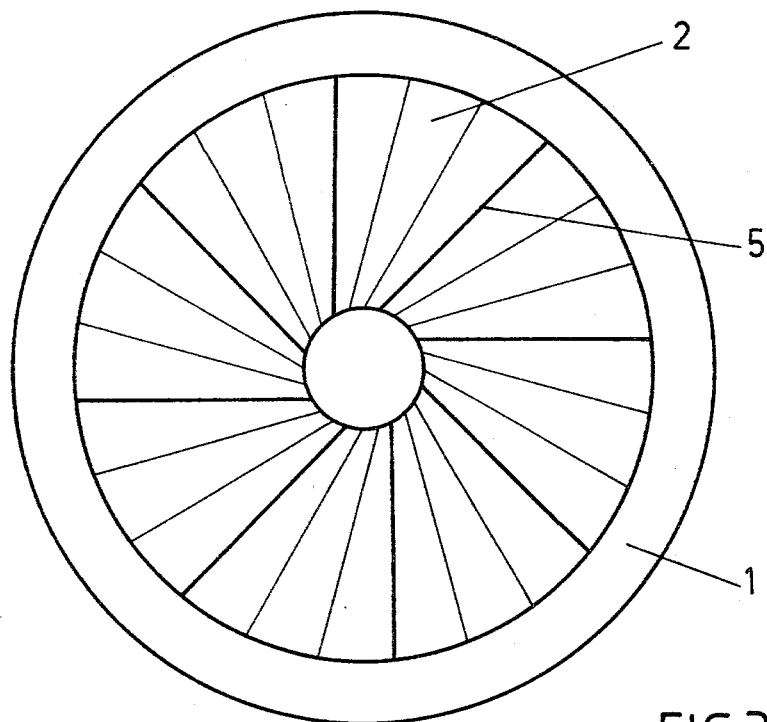
FIG. 3 shows the plan of a die half divided at an oblique angle.
Figure 4:
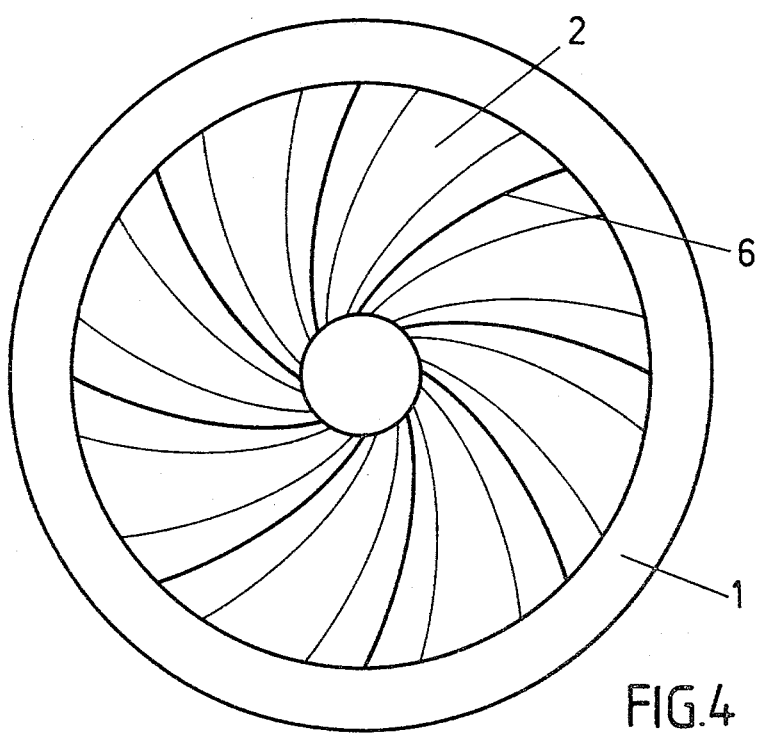
FIG. 4 shows the plan of a die half divided in arcs.

FIG. 3 and FIG. 4 each show a plan view of further illustrative embodiments of the divided die half. The segments 2 have flanks which are in an oblique position or extend in an arc, so that contact surfaces 4 or 5 respectively of the same type result. Shapes of this kind occur, for example, in the case of turbine wheels and compressor wheels having blades which do not extend radially. They can be produced in a simple manner on copy-milling machines and profile-grinding machines. A particular advantage of contact surfaces, which are not in a radial position, for adjacent segments 2 is that they can move more freely without jamming in the case of differential thermal expansion.

FIG. 5 shows a longitudinal section through an upper and a lower die half. The upper die half which represents the relatively complicated negative shape of a compressor wheel, is divided several times in the radial direction as well as in the axially progressing direction. The outer periphery of the segments 2 is held together by the ring 1, while the hub part is bounded by the sleeve 7 and the ejector 8. The die carrier which adjoins the die in the axial direction and is not shown in more detail, is likewise divided, various materials which are of no further interest in this context being used the die carrier in view of the required heat insulation. Corresponding to the simple plane boundary surface of the workpiece, the lower die half 9 consists of a single piece which is supported on the ram 10. Of course, the lower die half can likewise be of a divided design, if required.

FIG. 6 shows a perspective view of a segment-like individual component corresponding to the divided die-half according to FIG. 5. On the flank, the plane contact surface 4 in a radial position has a transition into the profiled blade surface 11 (negative form) of the compressor wheel. Two surfaces 11 of this type of adjacent segment 2 form in each case the groove into which the material of the workpiece flows during the forging process.

In all cases, the electrically insulating layer 3 preferably consists of the oxides of aluminium, magnesium, silicon, cerium or yttrium or mixtures of at least two of the above-mentioned oxides and has a thickness of 0.01 to 500μ. The insulating layer 3 can be applied to the individual component (for example segment 2) by plasma-spraying, flame-spraying or cathode sputtering.

In the case where the ring 1 also belongs to the shaping part of the die (in contrast to FIG. 1 and FIG. 5), it is preferably manufactured from the same material as the segments 2 so that all the components consist of a uniform material. If, however, the die has a complicated shape and if there is a division of tasks between components which effect the actual shaping and components which merely serve for holding, it is advantageous to select for the former a material having a higher hot strength and a higher wear resistance than that for the components facing away from the workpiece to be forged.

The components which are subject to the highest thermal and mechanical stress are preferably manufactured from molybdenum alloys of the TZM type. Such alloys contain in most cases 0.4–0.55% of Ti, 0.06–0.12% of Zr and 0.01–0.04% of C, the remainder being Mo. Alloys with a higher titanium content can also be used, such as, for example, 1.0–1.4% of Ti, 0.25–0.35% of Zr and 0.07–0.13% of C, the remainder being Mo. An alloy with 1.0–1.12% of Hf, 0.06–0.0675% of C and the remainder Mo, is also suitable for this purpose. Since molybdenum is more susceptible to oxidation at higher temperatures, tools of this type are without exception used in an atmosphere which is low in oxygen or free from oxygen. The blanketing gas employed is preferably argon.

In addition, nickel alloys of high limiting creep stress and of long life are preferentially used for the highly stressed components of the tool in place of TZM, because of the lower price. Such nickel alloys of the IN 100 or 713 LC type have, for example, the following compositions:

| | |
|---|---|
| 0.18% of C | 0.05% of C |
| 10.0% of Cr | 12.0% of Cr |
| 3.0% of Mo | 4.5% of Mo |
| 15.0% of Co | 2.0% of Nb |
| 4.7% of Ti | 0.6% of Ti |
| 5.5% of Al | 5.9% of Al |
| 0.014% of B | 0.01% of B |
| 0.06% of Zr | 0.01% of Zr |
| 1.0% of V | Remainder Ni |
| Remainder Ni | |

For those components of the dies which face away from the workpiece to be forged and which are subjected to less wear and also to a lower specific mechanical stress, nickel alloys of the Ni 115 or Inc 625 type having the following compositions are preferably employed for more stringent demands:

| | |
|---|---|
| 0.15% of C | 0.05% of C |
| 15% of Cr | 0.15% of Mn |
| 15% of Co | 0.3% of Si |
| 3.5% of Mo | 22% of Cr |
| 4.0% of Ti | 9% of Mo |
| 5.0% of Al | 4% of Nb |
| Remainder Ni | 3% of Fe |
| | 0.2% of Ti |
| | 0.2% of Al |
| | Remainder Ni |

For less stringent demands and lower forging temperatures, the components of the die, facing away from the workpiece, can also consist of stainless austenitic or ferritic steels or of a hot-work tool steel of the Cr/W, Cr/Mo or Cr/Ni type. Examples of the composition of preferred stainless steels are given as follows:

| Austenitic: | Ferritic: |
|---|---|
| Maximum 0.1% of C | 0.2–0.26% of C |
| Maximum 1.0% of Si | 0.1–0.5% of Si |
| Maximum 2.0% of Mn | 0.3–0.8% of Mn |
| Maximum 0.045% of P | Maximum 0.035% of P |
| Maximum 0.030% of S | Maximum 0.035% of S |
| 17–19% of Cr | 11–12.5% of Cr |
| 9–11.5% of Ni | 0.3–0.8% of Ni |
| 5 × % of C % of Ti | 0.8–1.2% of Mo |
| Minimum 8 + % of C % of Nb | 0.25–0.35% of V |
| Remainder Fe | Maximun 0.6% of W |
| | Maximum 0.05% of Nb |
| | Remainder Fe |

The following composition can be regarded as an example of a hot-work tool steel from the Cr/Mo group:
0.4% of C
1.0% of Si 5.3% of Cr
1.4% of Mo
1.0% of V Example of the manufacturing process:

A die corresponding to FIG. 5 for the isothermal forging of a compressor wheel from a titanium alloy of the Ti 6 Al 4V type was manufactured as follows:

A molybdenum alloy of the TZM type having the following composition:

0.5% of Ti
0.08% of Zr
0.02% of C
Remainder Mo was selected for all the components of the upper part of the die, which are subjected to high thermal and mechanical stresses.

The ring 1 and the sleeve 7 were machined by turning, and the segments 2 were machined by turning and milling. Especially the profiled blade surface 11 (FIG. 6) was produced by copy-milling. The segments 2 had contact surfaces 4 in a radial position (FIG. 2 and FIG. 6). After fine finishing, the surfaces of the components were polished and subsequently de-greased and cleaned under alcohol in an ultrasonic bath. The surfaces of the ring 1 and the sleeve 7, which are in contact with the segment surfaces and which are to be insulated, as well as the total surface of the segments 2 were then provided with an insulating layer 3 (FIG. 1 and FIG. 2). This process step was carried out by means of cathode sputtering of alumina. A target of highly pure, 99.98 percent $Al_2O_3$, having a density of 98% of the theoretical value, was sputtered in a cathode sputtering unit under an argon atmosphere and under a pressure of $10^{-4}$ mm Hg, at a power density of 0.17 kW/cm$^2$ of target area. The distance of the surface of the component to be coated from the target was 30 cm. After one hour, the thickness of the $Al_2O_3$ insulating layer 3 applied was 0.1μ. Greater layer thicknesses, for example 1μ, can also be obtained in this manner, and this requires a sputtering period of 10 hours. The requisite layer thickness depends on the shape and the fabricating accuracy as well as on the obtainable surface quality of the individual components of the die. After the application of the insulating layer 3 was completed, the individual parts were ready, without further surface treatment, for the assembly and for the use of the tool.

The shapes of the tool are not limited to the illustrative embodiments shown in FIGS. 1 to 6. It is self-evident that dies of a different geometry can also be built up according to this principle. In particular, tools having a square, rectangular, hexagonal and octagonal outline can also be produced. Moreover, the product to be forged does not have to be centro-symmetrical.

In principle, the tool can be used for all metallic materials which have a superplastic state and temperature range and which can be economically formed isothermally. This applies to a very particular degree to titanium alloys, and also to high-temperature resistant nickel alloys. Light metal alloys, such as aluminium alloys, can, however, also be forged isothermally in an advantageous manner with the aid of the tools described above.

The new tool according to the invention for isothermal forging has provided means for the hot-forming of metallic materials, which means meet to a very large extent all the demands of industrial practice. Uniform heating-through of both the tool and the workpiece is guaranteed by an optimum division of the die halves, an appropriate gradation of the materials required for the individual components and the application of an electrically insulating layer to the surface thereof. The build-up, according to the invention, of the tool ensures a cost-saving, simple manufacture, prevention of destructive welding of and attacks on adjacent tool components in the shop, simple maintenance, economical repairs, long operating periods and a long life.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Tool for isothermal forging, consisting of two die halves, at least one of which is divided at least once, characterised in that the divided die half is assembled from individual components, of which at least those individual components which face the workpiece to be forged are provided with a thin, electrically insulating layer on at least their contact surfaces.

2. Tool according to claim 1, characterised in that the electrically insulating layer consists of a mixture of at least one from the group consisting of $Al_2O_3$, MgO, $SiO_2$, $CeO_2$ or $Y_2O_3$ and has a thickness of 0.01 to 500 μ.

3. Tool according to claim 1, characterised in that the individual components of the divided die half consist of the same material.

4. Tool according to claim 1, characterised in that the components which face the workpiece to be forged consist of a material having a higher hot strength and a higher wear resistance than that of the components facing away from the workpiece to be forged.

5. Tool according to claim 4, characterised in that the components of the divided die half, which face the workpiece to be forged, consist of a molybdenum alloy.

6. Tool according to claim 5, characterised in that the molybdenum alloy contains 0.4–0.55% of Ti, 0.06–0.12% of Zr and 0.01–0.04% of C.

7. Tool according to claim 5, characterised in that the molybdenum alloy contains 1.0–1.4% of Ti, 0.25–0.35% of Zr and 0.07–0.13% of C.

8. Tool according to claim 5, characterised in that the molybdenum alloy contains 1.0–1.12% of Hf and 0.06–0.0675% of C.

9. Tool according to claim 4, characterised in that the components of the divided die half, which face the workpiece to be forged, consist of a high-temperature resistant nickel alloy.

10. Tool according to claim 9, characterised in that the nickel alloy contains 0.16 to 0.20% of C, 9 to 11% of Cr, 14 to 16% of Co, 2.6 to 3.5% of Mo, 4.2 to 5.0% of Ti, 5 to 6% of Al, 0.012 to 0.014% of B, 0.05 to 0.07% of Zr and 0.9 to 1.1% of V, the remainder being Ni.

11. Tool according to claim 9, characterised in that the nickel alloy contains 0.04 to 0.06% of C, 11 to 13% of Cr, 4 to 5% of Mo, 1.8 to 2.2% of Nb, 0.5 to 0.7% of Ti, 5.5 to 6.4% of Al, 0.008 to 0.012% of B and 0.08 to 0.12% of Zr, the remainder being Ni.

12. Tool according to claim 4, characterised in that, the components of the divided die half, which face away from the workpiece to be forged, consist of a nickel alloy.

13. Tool according to claim 12, characterised in that the nickel alloy contains 0.13 to 0.17% of C, 14 to 16% of Cr, 14 to 16% of Co, 3 to 4% of Mo, 3.5 to 4.5% of Ti and 4.5 to 5.5% of Al, the remainder being Ni.

14. Tool according to claim 12, characterised in that the nickel alloy contains 0.04 to 0.06% of C, 0.13 to 0.17% of Mn, 0.25 to 0.35% of Si, 20 to 24% of Cr, 8 to 10% of Mo, 3.5 to 4.5% of Nb, 2.5 to 3.5% of Fe, 0.18 to 0.22% of Ti and 0.18 to 0.22% of Al, the remainder being Ni.

15. Tool according to claim 4, characterised in that the components of the divided die half, which face away from the workpiece to be forged, consist of a stainless austenitic steel.

16. Tool according to claim 15, characterised in that the stainless austenitic steel contains a maximum of 0.1% of C, a maximum of 1% of Si, a maximum of 2.0% of Mn, a maximum of 0.045% of P, a maximum of 0.030% of S, 17 to 19% of Cr, 9 to 11.5% of Ni, a minimum of $(5 \times \%$ of C)% of Ti and a minimum of $(8 \times \%$ of C)% of Nb, the remainder being Fe.

17. Tool according to claim 4, characterised in that the components of the divided die half, which face away from the workpiece to be forged, consist of a stainless ferritic steel.

18. Tool according to claim 17, characterised in that the stainless ferritic steel contains 0.2 to 0.26% of C, 0.1 to 0.5% of Si, 0.3 to 0.8% of Mn, a maximum of 0.035% of P, a maximum of 0.035% of S, 11 to 12.5% of Cr, 0.3 to 0.8% of Ni, 0.8 to 1.2% of Mo, 0.25 to 0.35% of V, a maximum of 0.6% of W and a maximum of 0.05% of Nb, the remainder being Fe.

19. Tool according to claim 4, characterised in that the components of the divided die half, which face away from the workpiece to be forged, consist of a hot-work tool steel from the group consisting of Cr/W, Cr/Mo and Cr/Ni.

20. Tool according to claim 19, characterised in that the hot-work tool steel contains 0.35 to 0.45% of C, 0.8 to 1.2% of Si, 5.0 to 5.5% of Cr, 1.2 to 1.6% of Mo and 0.8 to 1.2% of V, the remainder being Fe.

21. Tool according to claim 1, characterised in that at least a part of the individual components of the divided die half consists of segment-like pieces of identical shape.

22. Tool for isothermal forging according to claim 1, in which at least those individual components which face the workpiece to be forged are provided with a thin, electrically insulating layer on all sides.

23. Tool according to claim 1 characterised in that at least a part of the individual components of the divided die half consists of segment-like pieces of different shape.

24. Tool according to claim 21 or 23 having flanks which extend radially.

25. Tool according to claim 21 or 23 having flanks which extend obliquely.

26. Tool according to claim 21 or 23 having flanks which extend in an arc.

27. A process for the production of a tool for isothermal forging, said tool comprising two die halves, at least one of which is divided at least once, the portions of said tool which face the workpiece being provided with a thin electrically insulating layer, said process comprising the steps of:
forming individual components of each said at least one die half by casting and/or forging;
machining said components;
forming said insulating layer on said components; and
assembling each said at least one die half from said individual components.

28. Process according to claim 27, characterised in that the components which face the workpiece to be forged are individually subjected to fine finishing by grinding and are then provided with an electrically insulating layer which is 0.01 to 500$\mu$ thick.

29. Process according to claim 27, characterised in that the parts of the die halves are brought into the raw shape by forging and are converted into the final form by machining.

30. Process according to claim 27, characterised in that the components which face the workpiece to be forged are individually subjected to fine finishing by polishing and are then provided with an electrically insulating layer which is 0.01 to 500$\mu$ thick.

31. Process according to claim 28 or 30 in which the electrically insulating layer is applied by plasma-spraying.

32. Process according to claim 28 or 30 in which the electrically insulating layer is applied by flame-spraying.

33. Process according to claim 28 or 30 in which the electrically insulating layer is applied by cathode sputtering.

* * * * *